(12) United States Patent
Lorenz et al.

(10) Patent No.: US 6,482,875 B2
(45) Date of Patent: *Nov. 19, 2002

(54) THERMOPLASTIC COMPOSITE MATERIAL

(75) Inventors: Juergen Lorenz, Bopfingen (DE); Ewald Wilka, Unterschneidheim (DE)

(73) Assignee: Dorus Klebetechnik GmbH & Co. KG, Bopfingen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,182

(22) PCT Filed: Apr. 27, 1998

(86) PCT No.: PCT/EP98/02486

§ 371 (c)(1), (2), (4) Date: Jan. 26, 2000

(87) PCT Pub. No.: WO98/50617

PCT Pub. Date: Nov. 12, 1998

(65) Prior Publication Data

US 2002/0032253 A1 Mar. 14, 2002

(30) Foreign Application Priority Data

May 2, 1997 (DE) .......................................... 197 18 633

(51) Int. Cl.[7] ................................................ C08L 89/00
(52) U.S. Cl. ............................ 524/11; 524/12; 524/15; 524/44
(58) Field of Search ............................... 524/11, 12, 15, 524/44; 428/151

(56) References Cited

U.S. PATENT DOCUMENTS

| 4,009,310 A | * | 2/1977 | Scobbo ........................ 428/95 |
| 4,273,821 A | * | 6/1981 | Pedlow ....................... 428/215 |
| 4,350,723 A | * | 9/1982 | Sugimura et al. .............. 428/42 |
| 4,552,909 A | * | 11/1985 | Czerwinski et al. ........... 524/11 |
| 5,169,884 A | * | 12/1992 | Lindenmann et al. ......... 524/44 |
| 5,958,554 A | * | 9/1999 | Addie ......................... 428/151 |

FOREIGN PATENT DOCUMENTS

| DE | 27 54 603 |   | 6/1979 |
| GB | 1 040 572 |   | 9/1966 |
| GB | 1105317 | * | 3/1968 |
| GB | 1 396 188 |   | 6/1975 |
| JP | 61 225378 |   | 10/1986 |
| JP | 08 173206 |   | 7/1996 |

OTHER PUBLICATIONS

Database WPI, AN96–365617, XP002077018.
Database WPI, AN86–302823, XP002077019.

* cited by examiner

Primary Examiner—Edward J. Cain
Assistant Examiner—Katarzyna Wyrozebski
(74) Attorney, Agent, or Firm—Stephen D. Harper; Daniel S. Ortiz

(57) ABSTRACT

The invention relates to a thermoplastic composite material containing at least 15 percent by weight of one or more organic fibrous material, and at least 15 percent by weight of thermoplastic binder, with binder containing at least two different polyacrylates. The thermoplastic composite material has a flow transition range of 70° C. to 130° C. The invention also relates to a method for producing the thermoplastic composite material and the use of the thermoplastic composite material to coat the surfaces of objects.

28 Claims, No Drawings

THERMOPLASTIC COMPOSITE MATERIAL

This application is filed under 35 U.S.C. 371 and based on PCT/EP98/02486, filed Apr. 27, 1998.

BACKGROUND OF THE INVENTION

1. Field of the Invention

This invention relates to a thermoplastic composite material containing an organic fibrous material or a mixture of two or more organic fibrous materials and a thermoplastic binder. The invention also relates to a process for producing the thermoplastic composite material and to the use of the composite material for coating surfaces of objects and to the objects thus coated. The invention also relates to an adhesive for bonding the composite material to the object to be coated.

2. Discussion of the Related Art

Composite materials are materials which are formed by incorporating a base material, for example in the form of fibers, in a second material (the matrix). Certain properties (for example mechanical properties, surface properties or certain behavior towards external influences) of the incorporated material are utilized for the composite material. The base material may vary widely in its quantity ratio to the matrix surrounding it. Thus, the percentage matrix content of wood-based materials, which include for example the known presspahn boards, is generally only 10 to 15%. By contrast, the percentage matrix content of fiber-reinforced plastics, for example glass fiber-reinforced plastics, can be significantly higher, for example more than 70% or even more than 80%.

In many cases, it is possible by suitably selecting the base material and the matrix to impart to the composite material certain properties of the base material which are paired with certain properties of the matrix. For example, the use of glass or natural fibers in thermosets can cause the tensile strength of the fibers to be transferred to the plastic matrix which, in turn, contributes further advantages to the composite material in regard to shaping, dimensional stability and processability.

In many cases, the object of making composite materials is to produce from by-products accumulating in the processing of a certain base material a material which possesses characteristic properties of that base material. The corresponding composite material may then generally be used at least as a substitute for the base material and thus provides for the "substance-related" utilization of the base material waste or by-products. This is the case, for example, with the utilization of wood waste in presspahn boards. Another example of the substance-related utilization of waste products is the processing of cutting and stamping waste from the manufacture of leather and shoes to leather fiber materials.

Leather waste can be reduced to fibers and can then be processed to leather fiber materials (LEFAs). LEFAs are generally single-layer materials of leather fibers and binders. Even at the end of the thirties, LEFA boards were being used in the shoe industry, for example for the production of counters, insoles and inner soles, slipper soles, heels and welts. LEFA materials were also used to a small extent for industrial leather seals.

Besides such properties as flexibility and durability which qualify leather for use in the shoe industry and in the leather goods industry, leather is being increasingly used in other areas where the decorative features of leather are predominant. However, it has hitherto been difficult or even impossible to use leather as a surface material for furniture fronts, wall and ceiling panels or other consumer goods. In particular, it was particularly difficult to use leather as a surface material for objects with a three-dimensional relief structure.

Since leather does not have any thermoplastic properties, it can only be used to a limited extent as a surface coating material. In particular, it is difficult to provide varying three-dimensional relief structures with a smooth leather surface by an economical process.

Such economical processes for coating relief-like surfaces of moldings are known, for example, from the film coating industry. In this case, a molding (object) is generally coated with a thermoplastic film by heating the molding and the film to a temperature above the flow transition limit of the plastic film and suitably drawing the film (for example by applying a vacuum between the molding and the plastic film) onto the molding (thermoforming). In general, an adhesive establishes a permanent bond between the plastic film and the molding.

However, a process such as this, which can be efficiently carried out with machine assistance, requires a thermoplastic film as the coating material. Hitherto, however, it has not been possible to finish leather-like substitute materials, for example LEFAs, in such a way that, on the one hand, they show the thermoplastic properties which are required for use in thermoforming processes but, on the hand, still have leather-like surface properties.

Accordingly, the problem addressed by the present invention was to provide a composite material which would largely exhibit the properties of the natural fibers used as the base material, but which on the other hand would be suitable for use in modern thermoforming processes by virtue of its thermoplastic properties. Another problem addressed by the present invention was to provide an adhesive with which the thermoplastic composite material could be firmly and durably bonded to a number of surfaces in the course of machine processing.

DESCRIPTION OF THE INVENTION

It has now been found that a thermoplastic composite material containing an organic fibrous material or a mixture of two or more organic fibrous materials and a thermoplastic binder as the matrix material can be obtained providing polyacrylates of at least one aqueous anionic polyacrylate dispersion and at least one aqueous cationic polyacrylate dispersion are used as the matrix material. The thermoplastic composite material obtainable in this way has a flow transition limit of about 70 to about 130° C. and is thus suitable for economical processing in surface coating.

Accordingly, the present invention relates to a thermoplastic composite material containing
 a) at least 15% by weight of an organic fibrous material or of a mixture of two or more organic fibrous materials as component A and
 b) at least 15% by weight of a thermoplastic binder as component B,
the binder containing at least two different polyacrylates and the thermoplastic composite material having a flow transition limit of 70° C. to 130° C.

Component A of the thermoplastic composite material may be any organic fibrous material which provides the thermoplastic composite material with the properties required by the user, for example a certain appearance or a certain feel. Organic fibrous materials in the context of the present invention are understood to be both naturally obtained or naturally obtainable fibers and synthetic fibers providing they have an "organic base". Accordingly, organic fibrous materials do not include, for example, such fibers as asbestos, glass fibers or carbon fibers.

In addition, no distinction is made in the present specification between materials which occur naturally in fibrous form and materials which have to be given a fibrous structure by a certain treatment step. In addition, among the natural materials, both vegetable and animal organic fibrous materials are suitable for the purposes of the invention.

Synthetic fibers, vegetable fibers or animal fibers are normally used for the purposes of the invention.

Suitable natural fibers include, for example, animal fibers, such as wool, hair or silk. Other suitable natural fibers are vegetable fibers, for example cotton, kapok, flax, hemp, jute, kenaf, ramie, broom, abaca, coconut or sisal. Suitable synthetic fibers of natural polymers are cupro fibers, viscose fibers, modal fibers, acetate fibers, triacetate fibers and protein fibers or alginate fibers or mixtures of two or more of the fibers mentioned.

Suitable fibers of synthetic polymers are, for example, polyacrylic, modacrylic, polyvinyl chloride, fluorine-containing polymer fibers, poly-ethylene, polypropylene, vinyl acetate, polyacrylonitrile, polyamide, poly-ester and polyurethane fibers.

However, it is particularly preferred to use leather fibers as the organic fibrous material. To obtain these fibers, leather waste is fiberized and size-reduced by a suitable process so that the fibers obtained can be subsequently used in the process according to the invention for producing a thermoplastic composite material with leather-like properties.

Basically, the leather fibers may be obtained from any type of leather waste. The leather waste may originate both from chrome-tanned leather and from vegetable-tanned leather. Leathers suitable for use in accordance with the invention include, for example, box leathers, such as hide box, calf box or mast box, buffed box, glazed kid, suede, kid, sandal leather, sole leather, lining leather, nappa leather, glove leather, buckskin, harness leather and industrial leather, chamois leather, hatband leather or transparent leather.

Depending on the decorative or mechanical effect required, the organic fibrous material may be size-reduced to a stretched length of about 0.1 to 15 mm. Where leather fibers in particular are used, fiber lengths of about 0.5 to 13 mm are suitable, fiber lengths of about 1 mm to about 10 mm being preferred and fiber lengths of about 3 to about 8 mm particularly preferred. The fiber length is measured in the stretched state of the fibers. Depending on the starting material used and the size reduction method applied, the fibers may of course assume an irregularly curved shape in the absence of any external influence.

Component A is present as the base material of the thermoplastic composite material according to the invention in a quantity of at least about 15% by weight. The thermoplastic composite material increasingly assumes the properties of the organic fibrous material with increasing percentage content of component A. Accordingly, depending on the desired effect, it can be of advantage to use, for example, at least 30% by weight of component A in the thermoplastic composite material according to the invention. However, the percentage content of the organic fibrous material may even be greater, for example about 35% by weight, 40% by weight, 45% by weight or even more than about 50% by weight, percentage contents of for example 55% by weight or even 60% by weight and more being possible. In one particularly preferred embodiment, the percentage content of fibrous materials is about 40 to about 60% by weight, percentage contents of about 45 to about 55% by weight being most particularly preferred.

Leather fibers are preferably present as component A in the thermoplastic composite material according to the invention.

In order to provide the thermoplastic composite material with the thermoplastic properties required for further processing, the thermoplastic composite material contains a thermoplastic binder as component B.

Binders in the context of the present invention are understood to be polymeric compounds which serve as the matrix of the composite material. Polymeric materials with a molecular weight of more than about 1,000 are generally used as binders. However, the molecular weight is preferably higher.

The molecular weight ($M_n$) of the polymers present in the binder is preferably in the range from about 10,000 to about 1,000,000, more preferably in the range from about 20,000 to about 300,000 and most preferably in the range from about 50,000 to about 150,000.

In the context of the present invention, the term "binder" is used for the polymeric matrix material as a whole, irrespective of the number of its constituent polymer components and irrespective of how many different preparations containing the polymers forming the binder were required for its production.

The molecular weight distribution of the polymers, which can be determined for example by gel permeation chromatography, does not have to be monomodal. If desired, the thermoplastic binder may also have a bimodal or higher modal distribution.

A binder of which one component is present in the form of at least one aqueous anionic dispersion is used for the production of the thermoplastic composite material according to the invention. The at least one anionic dispersion preferably contains at least one polyacrylate or a copolymer of at least one acrylate or methacrylate and at least one other compound containing an olefinically unsaturated double bond.

The terms "polyacrylate" and "polyacrylates" used in the present text apply in the following both to polymers or copolymers of acrylic acid and/or derivatives thereof and to polymers or copolymers of methacrylic acid and/or derivatives thereof.

Polyacrylates can be produced by subjecting acrylic acid and/or methacrylic acid and/or derivatives of acrylic acid and/or methacrylic acid, for example esters thereof with monohydric or polyhydric alcohols, either on their own or in the form of mixtures of two or more thereof in known manner to polymerization, for example radical or ionic polymerization. Polyacrylates in the form of an anionic dispersion obtainable, for example, by emulsion polymerization of the corresponding monomers and comonomers are preferred for the purposes of the invention. In general, aqueous anionic dispersions contain, for example, the sodium, potassium and/or ammonium salts of long-chain aliphatic carboxylic acids and/or sulfonic acids for emulsification. However, alkali metal $C_{10-18}$ alkyl sulfates, ethoxylated and sulfated and/or sulfonated long-chain aliphatic alcohols or alkylphenols and sulfodicarboxylic acid esters are also suitable.

In general, the polyacrylates used in accordance with the invention are not homopolymers, but rather copolymers which, besides the acrylates, also contain styrene, acrylonitrile, vinyl acetate, vinyl propionate, vinyl chloride, vinylidene chloride and/or butadiene.

Monomers suitable for use in the production of the polyacrylates are, in particular, methacrylate, ethyl acrylate, n-butyl acrylate, isobutyl acrylate, tert.butyl acrylate, hexyl acrylate, 2-ethylhexyl acrylate and lauryl acrylate. Acrylic acid, methacrylic acid, acrylamide or methacrylamide may optionally be added in small quantities as further monomers during the polymerization reaction.

Other acrylates and/or methacrylates containing one or more functional groups may optionally be present during the polymerization reaction. Examples of these other acrylates and/or methacrylates are maleic acid, itaconic acid, butanediol diacrylate, hexanediol diacrylate, triethylene glycol diacrylate, tetraethylene glycol diacrylate, neopentyl glycol diacrylate, trimethylol propane triacrylate, 2-hydroxyethyl acrylate, 2-hydroxyethyl methacrylate, hydroxypropyl acrylate, propylene glycol meth-acrylate, butanediol monoacrylate, ethyl diglycol acrylate and, for example, 2-acrylamido-2-methyl propane sulfonic acid as a monomer containing sulfonic acid groups. Acrylate/vinyl ester copolymers, acrylate/styrene copolymers and acrylate/methacrylate copolymers are particularly preferred. Polyacrylate dispersions of the type marketed by BASF AG, Ludwigshafen, under the registered name of Acronal®, more particularly the products Acronal® 500 D and Acronal® S312 D, are particularly preferred and suitable for use in the thermoplastic composite materials according to the invention.

In one particularly advantageous embodiment, the matrix of the thermoplastic composite materials according to the invention contains more than one polymer obtainable from an anionic dispersion.

In general, anionic polyacrylate dispersions contain only one type of polymer. If two different polyacrylates from anionic dispersions are to be used, it will generally be necessary to use two different anionic dispersions which contain the particular polymer in dispersed form. According to the invention, however, it is immaterial whether the different polyacrylates preferably present in the matrix are present in a single dispersion or whether they have been obtained from two or more different dispersions.

In one particularly advantageous embodiment, component B contains at least two polyacrylates from anionic dispersions. A particularly preferred embodiment is characterized in that the polymers present in the dispersions Acronal® 500 D and Acronal® S312 D are used as anionically charged polymers. It is particularly preferred if copolymers based on n-butyl acrylate and styrene and copolymers based on acrylate and vinyl acetate are present together in component B of the thermoplastic composite materials according to the invention.

In another particularly advantageous embodiment, the thermoplastic binder contains at least 50% by weight of polyacrylate obtainable from anionic dispersion or of a mixture of two or more such polyacrylates obtainable from anionic dispersions.

In one preferred embodiment, the thermoplastic binder contains at least 40% by weight of a copolymer of n-butyl acrylate and styrene.

It has also been found that the thermoplastic properties of the thermoplastic composite material according to the invention can be influenced by choosing polyacrylates having a suitable minimum film forming temperature. The minimum film forming temperature of a polymer is the lowest temperature at which a dispersion still just forms a coherent film after evaporation of the water. It is close to the glass transition temperature $T_g$ of the polymer and with film formation determines one of the most important performance properties of a polymer dispersion. The minimum film forming temperature (MFT) is generally determined in accordance with DIN 53787. The measuring instrument used is a metal plate to which a temperature gradient is applied. The film is observed for the temperature at which it begins to develop cracks or for the location of the so-called white point at which the cloudy film begins to become clear.

According to the invention, it is of advantage for at least one of the polyacrylates from anionic dispersion to have a minimum film forming temperature of up to 30° C.

In one particularly advantageous embodiment, at least one of the polyacrylates from anionic dispersion has a minimum film forming temperature of up to about 5° C. and at least one other polyacrylate from anionic dispersion has a minimum film forming temperature of about 15° C. to about 25° C.

Besides the at least one polyacrylate from anionic dispersion, component B of the thermoplastic composite material according to the invention contains at least one polyacrylate from cationic dispersion.

Cationic polyacrylate dispersions differ from the anionic dispersions in the choice of the emulsifier. In their case, ammonium, sulfonium or phosphonium compounds, which contain at least one aliphatic hydrocarbon chain as the hydrophobic part of the molecule, are generally used.

According to the invention, particularly suitable cationic polyacrylate dispersions are, for example, the dispersions of copolymers based on styrene and acrylates which are marketed by BASF AG, Ludwigshafen, under the registered name of Acronal® DS 3476.

The cationic polyacrylate dispersion preferably has a minimum film forming temperature of at least about 40° C. However, the minimum film forming temperature is preferably higher, for example 45° C., 50° C. or 55° C. Cationic polyacrylate dispersions with a minimum film forming temperature of about 60° C. or higher, for example about 65° C. or about 70° C. or higher, are particularly preferred.

The total percentage content of component B in the thermoplastic composite material is preferably at least about 15% by weight. In one advantageous embodiment, the thermoplastic composite material contains at least about 20% by weight or at least about 30% by weight of component B, for example for selectively modifying the properties of the composite material.

Besides the polyacrylates mentioned, the thermoplastic binder may optionally contain other polymers, for example polyurethanes, polyesters, polyethers, polyamides, polyolefins or mixtures of two or more thereof. However, in one preferred embodiment, the thermoplastic binder contains at least 85% by weight of polyacrylates.

Besides the organic fibrous material as component A and the thermoplastic binder as component B, the thermoplastic composite material according to the invention may contain other components, preferably in a quantity of up to about 15% by weight. These other components include, for example, inorganic salts, cationic polymers, preservatives, dyes, natural and/or synthetic fats, paraffins, natural and/or synthetic oils, silicone oils and ionic and/or nonionic surfactants.

Salts of aluminium or copper are preferably used as the inorganic salts, aluminium sulfate being particularly preferred.

The inorganic salts are generally used in the production process, which will be described hereinafter, to precipitate (coagulate) the polymeric binder. In general, most of the metal salt is removed from the composite material with the aqueous phase although a small residue can remain in the composite material.

Cationic polymers or cationically charged polymers are polymers which carry positive charges on the polymer backbone or on side groups covalently bonded to the polymer backbone.

Cationic charges can be applied to a polymer by application of suitable cationic groups. "Cationic groups" are understood to be groups which either carry a positive charge or which can be converted into a group carrying a cationic charge by a simple reaction, for example quaternization. In general, the groups in question are amine or ammonium groups.

"Quaternization" is understood to be a reaction in which a primary, secondary or tertiary amine is converted into the tetravalent positively charged form by reaction with a suitable reagent. Suitable reagents are, for example, alkyl halides, more especially alkyl chlorides, alkyl bromides and alkyl iodides, and protonic acids, for example mineral acids, such as hydrohalic acid, phosphonic acid, sulfuric acid, or strong organic acids, such as formic or acetic acid.

Suitably modified polyacrylates, polyesters, polyurethanes or other polymers carrying at least one primary, secondary or tertiary nitrogen atom may be used as the polymers bearing cationic groups. Polyacrylates bearing cationic groups are preferably used for the purposes of the present invention.

Corresponding polyacrylates can be produced, for example, by copolymerizing the monomers described above (except for the monomers bearing free acid groups) together with a suitable ethylenically unsaturated compound bearing a primary, secondary or tertiary amino group. Suitable ethylenically unsaturated monomers containing primary, secondary or tertiary amino groups are, for example, dimethylaminoethyl methacrylate, dimethylaminoneopentyl acrylate, dimethylaminopropyl methacrylate aminoethyl methacrylate, 2-N-morpholinoethyl acrylate, tert.butylaminoethyl methyl acrylate, 4-methacrylamido-2,2,6,6-tetramethyl piperidine, trimethyl ammonium methyl (meth) acrylate chloride, â-acetamidodiethyl amino-ethyl(meth) acrylate chloride, trimethyl ammonium propyl acrylate chloride or methacrylate chloride, trimethyl ammonium methyl acrylate bromide or methacrylate bromide, trimethyl ammonium neopentyl methacrylate chloride or acrylate chloride, diallyl dimethyl ammonium chloride, diallyl butyl methyl ammonium bromide. The cationically charged polymers preferably have a pH value of about 3 to about 8 although, in one particularly preferred embodiment, the pH value of the cationically charged polymers is neutral, i.e. in the range from about 6.5 to about 7.5.

The charge density, i.e. the number of cationic groups per unit weight in the polymer, is preferably about 2 to about 6 meq/g and, in one particularly preferred embodiment, is in the range from about 2.5 to about 5 meq/g. Most particularly preferred charge densities are in the range from about 3.5 to about 4.5 meq/g.

The cationic polymers generally have an molecular weight of about 1,000 to about 500,000, molecular weights of about 50,000 to about 150,000 being preferred and those in the range from about 80,000 to about 120,000 being particularly preferred.

Preferred preservatives are those which have a fungicidal action spectrum. The preservative Preventol® A11D marketed by Bayer AG, Leverkusen, is particularly suitable for the purposes of the present invention.

In one particularly preferred embodiment, component B contains about 10 to about 60% by weight and preferably at least about 40% by weight of at least one copolyacrylate of n-butyl acrylate and styrene, about 12 to about 60% by weight of at least one other copolyacrylate of an acrylate and vinyl acetate, optionally up to 30% by weight of another polyacrylate or copolyacrylate of an acrylate and styrene, the acrylate not being n-butyl acrylate, and optionally up to 15% by weight of inorganic salts, preservatives, dyes, natural and/or synthetic fats, paraffins, natural and/or synthetic oils, silicone oils, ionic and/or nonionic surfactants.

The thermoplastic composite material according to the invention is preferably intended for coating surfaces having a relief structure. Such coatings are normally applied by so-called thermoforming. To this end, the thermoplastic composite material must have a flow transition range of about 70 to 130° C.

At temperatures above the flow transition range mentioned, the thermoplastic composite materials according to the invention can undergo irreversible dimensional changes, for example elongation.

The present invention also relates to a process for the production of a thermoplastic composite material containing a) at least 15% by weight of an organic fibrous material or of a mixture of two or more organic fibrous materials as component A and b) at least 15% by weight of a thermoplastic binder as component B, characterized in that at least one anionic polymer dispersion and at least one cationic polymer dispersion which together form component B are added simultaneously or successively in any order to component A of fibers with a stretched fiber length of 0.1 to 15 mm, followed by treatment with an aqueous solution of an aluminium salt or a copper salt, drainage and drying.

The following exemplary description of the process is merely intended to illustrate one way of carrying out the process according to the invention and does not represent a limitation. Modifications of subsequent process steps, optionally with a view to optimizing the process described hereinafter, may readily be undertaken by the expert according to the situation confronting him.

To produce the thermoplastic composite materials according to the invention, tanned leather waste is size-reduced (precut) in cutter mills to a size of about 1 cm$^2$. At this stage, size reduction is generally carried out under dry conditions. The leather waste thus precut is weighed and then wet-fiberized in so-called disk refiners. The addition of water is controlled in such a way that a lump-free fiber slurry consisting of about 5% by weight of fibers and about 95% by weight of water is formed (corresponding to about 1,000 kg of fibers to 20 m$^3$ of water). The size reduction step is preferably carried out in such a way that part of the wastewater subsequently formed in the process is returned to the circuit at this point. In this way, around 50% and preferably more of the water required for the size reduction step is made up of wastewater.

The suspension of leather fibers in water obtainable in this way is then transferred to a suitable vessel, preferably a mixing vat. The quantity transferred is gauged in such a way that the concentration of leather fibers, based on the mixture as a whole, is between about 1.5 and about 2.5% by weight.

If the leather fibers contain chrome-tanned leather or if the leather fibers consist solely of chrome-tanned leather, vegetable tanning agents, for example chestnut wood extract, quebracho, mimosa or valonea, are first added.

Oiling agents are then added. Suitable oiling agents are any leather oiling agents which are emulsifiable in water. Sulfated fish oils are preferably used, for example Licrol®

DM 10, a product of Erberle, Coriatol U6, a product of Polychemie, or Coripol 2397, a product of TFL.

Dyes may also be added to the mixture. The dyes used are normally quantitatively absorbed iron oxide dyes, for example Bayferrox® 960 (a product of Bayer AG).

Preservatives, for example Präventol A11D (Bayer AG), natural and/or synthetic fats, natural and/or synthetic oils, silicone oils and/or ionic and/or nonionic surfactants, may also be added to the mixture.

If the additives are insoluble in water or do not self-emulsify in water, they are generally added to the mixture in the form of emulsions.

The various (anionic and cationic) binder dispersions are then added.

The binder dispersions may be added to the mixture either at the same time or successively in any order. In one preferred embodiment, the at least one anionic polymer dispersion and the at least one cationic polymer dispersion are successively added in any order.

The anionically stabilized binder dispersion(s) is/are advantageously added separately from the cationically stabilized binder dispersion(s). The order of addition is not important. For example, the anionically stabilized binder dispersion(s) may be added first, followed by the cationically stabilized binder dispersion(s). It is also possible—where several anionically stabilized binder dispersions and one or more cationically stabilized binder dispersions are used in the production of the thermoplastic composite material according to the invention—alternately to add the anionically stabilized binder dispersions and cationically stabilized binder dispersion or the cationically stabilized binder dispersions.

After the binder dispersions have been added, a solution of an aluminium salt or a copper salt is added to the mixture. Aluminium sulfate is preferably used. Around 90 to 150 l, preferably around 100 to 130 l and, in a particularly preferred embodiment, around 120 l of an approximately 20 to preferably about 50% by weight aluminium sulfate solution are added per 1,000 kg of mixture.

During but preferably after the metal salt treatment, the mixture is treated with a solution of a cationically charged polymer. The cationically charged polymer preferably has a molecular weight of no more than about 150,000 and advantageously in the range from about 80,000 to about 120,000.

The charge density of the cationically charged polymer is about 2.00 to 5.00 meq/g, preferably in the range from about 2.50 to about 4.50 meq/g and more preferably in the range from about 3.00 to about 4.00 meq/g.

The cationically charged polymer is used in a quantity of about 0.1 to 10% by weight, preferably in a quantity of about 1 to 8% by weight and more preferably in a quantity of about 2 to 6% by weight, based on the total solids in the mixture.

In one preferred embodiment, the cationically charged polymer is added in a quantity of about 3.5 to about 4.5% by weight, based on the total solids in the mixture.

After stirring for about 1 hour, the mixture is freed from excess water using a suitable drainage machine. Although drainage machines operating on the co-called batch principle, for example a so-called Muller press, may be used for this purpose, continuous drainage in a fourdrinier machine is preferred. The mixture is drained to a residual water content of around 70% by weight in the fourdrinier machine.

After the drainage step, the material obtained is pressed in a suitable press, preferably an intermittent press, under a pressure of about 1,000 to about 3,000 t and preferably in the range from about 1,500 to about 2,500 t.

The material thus treated is then passed through a suitable thermal dryer, in which it is dried to a residual water content of about 10% by weight, and thereafter is wound onto rolls.

The films obtained in this way have a flow transition range of from about 70 to about 130° C. and are thus suitable for modern surface coating processes, preferably so-called thermoforming processes.

An adhesive is generally used to establish a permanent bond between the surface coating material and the surface to the coated. Adhesives in the context of the present invention are understood to be non-metallic, preferably organic materials which bond parts to be joined by surface adhesion and internal strength.

Suitable adhesives include, for example, glues, dispersion adhesives, solvent-based adhesives and/or contact adhesives.

Organic adhesives—either physically setting adhesives or chemically reacting adhesives or a combination of the two—are preferably used for the purposes of the invention. Physically setting adhesives which may be used for the purposes of the invention include, example, dissolved or dispersed adhesives, contact adhesives or hotmelt adhesives. Suitable chemically reacting adhesives are, for example, those which impart adequate adhesion to the surfaces to be joined to one another without emitting volatile constituents. However, it is also possible to use adhesives which produce the necessary adhesion while emitting volatile constituents. The adhesives may be both cold-curing and hot-curing adhesives, may have a thermoplastic, thermoset or elastomeric end state and may be applied as one-component adhesives or as two- or multi-component adhesives.

In general, it is of advantage to expose the surfaces to be joined to a high pressure after they have been fitted together. Accordingly, one particular embodiment of the present invention is characterized by the use of adhesives which, after application of pressure to the surfaces to be joined together, produce improved adhesion in relation to pressureless processing.

The adhesives used in accordance with the present invention advantageously contain at least three different macromolecular compounds as coupling agents.

Coupling agents in the context of the present invention are macromolecular compounds which mainly contribute towards the generation of the adhesion and cohesion forces between the surfaces to be bonded.

According to the invention, a combination of polyurethane, polyacrylate and ethylene/vinyl acetate copolymer (EVA copolymer), preferably in the form of an aqueous dispersion, is preferably used as the coupling agent. This procedure has the advantage that the individual components can readily be mixed to form the final formulation.

More particularly, the adhesive according to the invention contains about 30 to 120 parts by weight of a preferably anionic polyester polyurethane dispersion.

Polyester polyurethanes can be obtained by reacting generally relatively low molecular weight OH-terminated polyesters with at least difunctional isocyanates to form urethane links. The polyesters generally have a molecular weight of at least about 400 and preferably of at least about 500. Both aromatic and aliphatic polyesters may be used although aromatic polyesters are normally not suitable as the sole polyester component in view of their marked tendency to crystallize and their lack of flexibility.

In general, the acid components involved in the synthesis of the polyester are, for example, aliphatic dicarboxylic acids, such as butane-1,4-dicarboxylic acid, pentane-1,5-dicarboxylic acid, hexane-1,6-dicarboxylic acid, heptane-1, 7-dicarboxylic acid and other higher homologs with an increasing number of carbon atoms. In addition, aromatic dicarboxylic acids, for example terephthalic acid or isophthalic acid may be used.

In general, any aliphatic dialcohols containing 2 to about 20 carbon atoms may be used as the diol component for the production of the polyesters. Preferred dialcohols are ethylene glycol, propylene glycol, butylene glycol, pentane-1,5-diol, hexane-1,6-diol, heptane-1,7-diol, octane-1,8-diol, nonane-1,9-diol, decane-1,10-diol and higher homologs thereof containing up to 20 carbon atoms. Aliphatic diols containing 2 to 10 carbon atoms and preferably about 4 to 8 carbon atoms are preferably used.

The polyesters may also have been produced using acid or alcohol components with a functionality different from 2. Suitable acid components with a functionality of 3 or more are, for example, 1,2,3-propane tricarboxylic acid, hemimellitic acid, trimellitic acid, trimesic acid and 1,2,4,5-benzenetetracarboxylic acid. Trihydric or higher alcohol components are, for example, glycerol, trimethylol propane, pentaerythritol and carbohydrates such as, for example, the monomeric sugar compounds, more especially glucose.

The reaction products of dihydric or higher alcohols with ethylene oxide and/or propylene oxide may also be used as the diol component.

Basically, mixtures of several different acids and several different alcohols may also be reacted with one another.

The reaction generally proceeds with a stoichiometry which, on the one hand, enables the required molecular weight to be established (generally about 400 to about 10,000 and preferably about 500 to about 5,000) and, at the same time, ensures that the polyester contains at least one hydroxy group in the molecule, preferably as the terminal group.

The described polyesters are then reacted with isocyanates having a functionality of two or more, for example with triiusocyanates or tetraisocyanates. In principle, any aliphatic or aromatic polyisocyanates may be used for this purpose. Preferred polyisocyanates are, for example, hexamethylene-1,6-diisocyanate, 2,4- and 2,6-toluene diisocyanate and 4,4'-diisocyanatodiphenyl methane (MDI). If toluene diisocyanate is used, it is preferably used in the form of an isomer mixture in which the 2,4- and 2,6-isomers are present in a ratio of about 80 to about 20.

The polyurethanes are preferably present in dispersed form, water preferably being the continuous phase. Anionic emulsifiers are generally used.

In one particularly preferred embodiment, the polyurethane dispersions have a solids content of about 35 to about 65% and a viscosity (according to DIN 53019) of less than about 1,000 mPas, preferably in the range from about 100 to about 900 mPas and more preferably in the range from about 200 to about 800 mpas. The pH value is preferably in the range from about 5 to about 9 and more preferably in the range from about 6.5 to about 7.5. The minimum film forming temperature (DIN 53787) of the preferred polyurethane dispersions is between about 2 and about 10° C., preferably between about 4 and about 6° C. and, in a particularly preferred embodiment, around 5° C. The softening point of the films obtainable from these polyurethane dispersions may be above 100° C., as determined in accordance with ASTM D 816, but is preferably of the order of 80° C. or lower, for example around 60° C.

Examples of commercially available polyurethane dispersions suitable for use in accordance with the invention are Dispercoll® U 42, Dispercoll® U 53, Dispercoll® U 54, Dispercoll® KA 8481 (products of BAYER AG), Quilastic® DEP-172 and/or Quilastic® 144-66. Dispercoll® U 53 is particularly preferred.

The polyacrylates are also preferably used in the form of an aqueous dispersion. In one particularly preferred embodiment, the dispersion is based on anionic emulsifiers. The polyacrylate dispersions are preferably polymer dispersions which, basically, may already be used as adhesives, so-called acrylate adhesives. Polyacrylates are preferably based on acrylic acid esters, preferably methyl, ethyl, n-butyl, isobutyl or 2-ethylhexyl esters of acrylic acid. The corresponding esters of methacrylic acid may also be used together with or instead of the acrylic acid esters. The acrylates and/or methacrylates may be copolymerized with other substances which contain an olefinically unsaturated double bond. In a preferred embodiment, these other substances are, for example, vinyl esters of carboxylic acids, for example vinyl acetate, or styrene.

The polyacrylates may optionally contain functional groups which allow subsequent crosslinking, for example by an increase in temperature. The functional groups in question are preferably functional groups which can be crosslinked by adding a small quantity of a catalytically active substance and increasing the temperature. In a particularly preferred embodiment, an acid or any other compound which is capable of releasing an acid by an increase in temperature in a suitable environment, for example an aqueous environment, is used as the catalyst. Such compounds as oxalic acid, ammonium chloride, magnesium chloride and/or diammonium phosphate are preferably used.

The polyacrylate dispersions preferably have a viscosity at 23° C. (DIN 53019) of about 20 to about 5,000 mpas. The pH value of the preferred dispersions is generally in the range from about 2 to about 9 and preferably in the range from about 2.5 to about 8. All the polyacrylate dispersions used have a minimum film forming temperature (DIN 53787) below about 1° C. and preferably below about 0° C. The polyacrylates generally have a glass transition temperature of less than about −20° C., preferably less than −30° C and, in a particularly preferred embodiment, less than −35° C., for example in the range from −40° C. to −45° C. The average particle size of the dispersed polyacrylate particles is preferably less than about 70 im and, more preferably, less than about 65 im.

Preferred commercial products are obtainable, for example, from BASF under the name of Acronal® V 205, from Merquinsa under the Quiacryl® 126-07 or from Rohm under the name of Plextol® E 220.

EVA copolymers are copolymers of ethylene and vinyl acetate. The two monomers can be copolymerized in any quantity ratios using radical initiators. The copolymers obtained are characterized by a statistical distribution of the monomer units in the polymer chains. The properties of the EVA copolymers may be varied within wide limits through the molar ratio of ethylene to vinyl acetate. For example, products with an ethylene content of less than 30% by weight are partly crystalline and thermoplastic while products with a vinyl acetate content of about 40 to about 70% by weight are substantially amorphous. The EVA copolymers are generally produced by bulk, emulsion or solution polymerization. The molecular weight of the EVA copolymers used in accordance with the invention is in the range from about 10,000 to about 1,500,000. The EVA copolymers are preferably used in the form of an aqueous dispersion with a solids content of about 40 to about 70% by weight and preferably in the range from about 50 to about 60% by weight. The dispersion has a viscosity (according to ISO 2555 at 23° C., Brookfield (RVT), 20 r.p.m., spindle 4) in the range from about 2,000 to about 13,000 mPas. For example, dispersions with a viscosity in the range from about 4,000 to about 6,000 mPas, from about 6,000 to about 12,000 mPas or from about 2,500 to about 4,000 mPas may be used in accordance with the invention. The dispersions have a pH value of about 3 to about 6 and preferably in the range from about 3.8 to about 4.8. The dispersions produce opaque, transparent or clear films and generally have a minimum film forming temperature of less than 5° C., preferably less than about 3° C. and, in a particularly preferred embodiment, around 0° C. The films have a tear strength (standard conditioning atmosphere of 23° C./50% relative humidity according to DIN 50014) of about 2.5 to about 9 N/mm². For example, dispersions which produce films having a tear strength of about 3 N/mm², 6 N/mm² or about 8 N/mm² may be used in accordance with the invention. The films produced from the dispersions should have an elongation at break (as determined in accordance with DIN 50014 in a standard conditioning atmosphere of 23° C./50% relative humidity) of about 500 to about 900%. The films should have a cold crack temperature (DIN 53372) of at most about 4° C.

The adhesive according to the invention may contain other components, for example wetting agents, thickeners, preservatives or defoamers.

Wetting agents are used to improve substrate wetting in aqueous systems. In the present case, wetting agents improve the wetting of the thermoplastic composite material and of the surface to be bonded thereto. Basically, any surfactants which do not adversely affect the stability of the adhesive dispersion may be used as wetting agents, although polyether-modified dimethyl polysiloxanes are preferably used. The commercially available product BYK® 346, a product of BYK Chemie GmbH, or Lumiten® IRA is particularly suitable.

Organic high molecular weight substances which absorb water and swell in the process, finally changing into viscous solutions, are used as thickeners. Suitable thickeners are, for example, natural thickeners, such as agar agar, carrageen, tragacanth, gum arabic, alginates, pectins, polyoses, guar gum, locust bean gum, starch, dextrins, gelatine or casein. Modified natural materials such as, for example, carboxymethyl cellulose and other cellulose ethers, hydroxyethyl and hydroxypropyl cellulose and gum ethers may also be used.

Organic synthetic thickeners, such as polycarboxylic acids, polyethers, polyimines, polyamides and certain vinyl polymers, are also suitable and are preferably used for the purposes of the present invention. Such thickeners as polyvinyl alcohol or polycarboxylic acids, for example carboxyfunctional acrylate copolymers, or vinyl pyrrolidone copolymers are preferred. The thickeners are used in the form of an aqueous solution or aqueous dispersion with a solids content of generally about 20 to about 40% by weight and preferably in the range from about 25 to about 30% by weight. Commercially available thickeners which may be used for the purposes of the invention are, for example, Collacral® VL (BASF) or Latekoll® D (BASF).

A suitable defoamer is, for example, Agitan® 281 (Münzing Chemie).

A suitable preservative is, for example, Aktizid® RS (Thorchemie).

Accordingly, the present invention also relates to an adhesive which at least contains
 about 40 to 100 parts by weight of at least one aqueous polyester polyurethane dispersion,
 about 20 to 40 parts by weight of at least one aqueous polyacrylate dispersion,
 about 15 to about 30 parts by weight of at least one aqueous dispersion of an EVA copolymer,
 optionally up to about 0.5% by weight of wetting agent,
 optionally up to about 0.5% by weight of defoamer,
 optionally up to about 0.5% by weight of preservative and
 about 0.5 to about 2% by weight of thickener.

In one particularly preferred embodiment, the adhesive contains
 about 60% by weight of an aqueous polyester polyurethane dispersion,
 about 20% by weight of an aqueous polyacrylate dispersion,
 about 17% by weight of an aqueous dispersion of an EVA copolymer,
 about 0.5% by weight of wetting agent,
 about 0.2% by weight of defoamer,
 about 0.3% by weight of preservative and
 about 2% by weight of thickener.

The adhesive is applied to the substrate, preferably a presspahn board, to be coated with the thermoplastic composite material by means of a spray gun or any other suitable tool. In order to increase heat and moisture resistance, aliphatic or aromatic isocyanates, for example those mentioned above, may be stirred into the adhesive immediately before application in a quantity of up to about 5% by weight.

After a drying time of not less than 30 minutes, the LEFA cuttings are placed onto the substrate to be coated and pressed at a temperature of about 80 to about 100° C. The pressing time is between about 10 and about 240 seconds and preferably between about 30 and about 120 seconds, depending on the thickness of the LEFA cutting. The pressure applied during pressing is in the range from about 2 to about 10 bar and preferably in the range from about 3 to about 6 bar.

Accordingly, the present invention also relates to the use of an adhesive with the composition mentioned above for coating objects, preferably for coating furniture, parts of furniture, wall and/or ceiling panels. In addition to the decorative aspect, the parts of furniture thus coated have an excellent sound-absorbing and sound-reflection-reducing effect.

The present invention also relates to the use of the thermoplastic composite material according to the invention or of a thermoplastic composite material produced in accordance with the invention for the surface coating of objects. The objects are preferably furnishings and, in a particularly preferred embodiment, pieces of furniture.

The present invention also relates to objects coated with the thermoplastic composite material according to the invention or with a composite material produced by the process according to the invention. The objects are preferably furnishings and, in a particularly preferred embodiment, pieces of furniture.

The present invention also relates to a process for the surface coating of an object in which the object and a thermoplastic material are heated to a temperature above the flow transition limit of the thermoplastic material, the thermoplastic material is applied to the object and the object and the thermoplastic material are subsequently cooled to a temperature below the flow transition limit of the thermoplastic material, characterized in that the thermoplastic composite material according to the invention or a thermoplastic composite material produced by the process according to the invention is used as the thermoplastic material.

The thermoplastic composite material is preferably applied by thermoforming in a vacuum. The thermoplastic composite material is preferably present in the form of films with a thickness of about 0.5 mm to about 1.0 mm and preferably with a thickness of about 0.6 mm to about 0.8 mm.

The present invention also relates to objects of the type mentioned above which have been coated using an adhesive with the composition indicated above, preferably with a film and, in a particularly preferred embodiment, with an LEFA film.

The following Examples are intended to illustrate the invention without limiting it in any way.

EXAMPLES

A thermoplastic composite material according to the invention was produced as follows:

5 Parts by weight of Fakonoxgelb 12376 and Fakonoxgelb 12365 (from Carboscholz) and 10,000 parts by weight of water were added to 800 parts by weight of wet chrome leather parings.

7 Parts by weight of 50% sodium hydroxide, 5 kg of Licrol® DM 10 (90% by weight of active substance) and 5 kg of Tecol®) SP (Trubchemie, 60% by weight active substance) were then added to the mixture. 250 Parts by weight of Acronal®S312 D, 150 parts by weight of Acronal® 500 D and 100 parts by weight of Acronal® DS 3476 were then added and the mixture was stirred for about 5 minutes.

The mixture was then coagulated with 70 parts by weight of a 50% aluminium sulfate solution.

5 Parts by weight of Hedifix® L 50 (from Kolb AG, 45% by weight active substance) and 1 part by weight of Praventol® A11D (45% by weight active substance) were then added and the mixture was stirred/left standing for another 60 minutes.

After drainage and drying, the material obtained had the characteristic data listed in Table 1:

| Type | ML | Test |
|---|---|---|
| Material thickness (mm) | 0.60 | Frank Thickness gauge DIN 53326 / IUP 4 |
| Specific gravity (g/cm³) | 0.85–0.95 | DIN 53327 / IUP 5 |
| Test strength, dry (Mpa) | 15.0 | DIN 53328 / IUP 6 |
| Elongation, dry (%) | 25 | DIN 53328 / IUP 6 |
| Stitch tear strength (N/mm) | 30 | DIN 53331 100 mm/min. |

Heat resistance: long-term at least 80° C., short-term up to 200° c.
Thermoformability: 80–120° C.

EXAMPLE 2

An adhesive for bonding the LEFA material according to the invention to the surface to be coated was prepared from 60% by weight of Dispercoll U 53, 20% by weight of Quiacryl 126-07, 17% by weight of Vinnapas Dispersion EP-17 and a total of 3% by weight of wetting agent, thickener, defoamer and preservative. The adhesive guaranteed a permanent bond between the LEFA material and a surface of presspahn.

What is claimed is:

1. A thermoplastic composite material comprising:
   A) at least 15 percent by weight of on or more organic fibrous materials; and
   B) at least 15 percent by weight of a thermoplastic binder, wherein said binder comprises a mixture formed from a mixture of at least two different polyacrylate dispersions, and wherein the thermoplastic composite material has a flow transition range of 70° C. to 130° C.

2. The composite material of claim 1 comprising at least 30 percent by weight of said organic fibrous material A.

3. The composite material of claim 1 comprising more than 50 percent by weight of said organic fibrous material A.

4. The composite material of claim 3 comprising more than 60 percent by weight of said organic fibrous material A.

5. The composite material of claim 2 comprising from 40 to 60 percent by weight of said organic fibrous material A.

6. The composite material of claim 5 comprising from 45 to 50 percent by weight of said organic fibrous material A.

7. The composite material of claim 1 wherein component A comprises synthetic fibers, vegetable fibers or animal fibers.

8. The composite material of claim 1 wherein component A comprises leather fibers.

9. The composite material of claim 7 wherein the fibers of component A have a stretched length of about 0.1 to about 15 mm.

10. The composite material of claim 1, comprising at least 20 percent by weight of thermoplastic binder B.

11. The composite material of claim 10, comprising at least 30 percent by weight of thermoplastic binder B.

12. The composite material of claim 1 wherein the thermoplastic binder comprises at least 85 percent by weight of one or more polyacrylates.

13. A thermoplastic composite material which comprises
   A) at least 15 percent by weight of one or more organic fibrous materials; and
   B) at least 15 percent by weight of a thermoplastic binder, wherein said binder comprises a mixture formed from a mixture of at least two different polyacrylate dispersions; wherein, the thermoplastic binder comprises at least 40% by weight of a copolymer of n-butyl acrylate and styrene, and wherein the thermoplastic composite material has a flow transition temperature in a range of 70° C. to 130° C.

14. A thermoplastic composite material which comprises:
   A) at least 15 percent by weight of one or more organic fibrous materials; and
   B) at least 15% by weight of a thermoplastic binder, wherein said binder comprises a mixture formed from a mixture of at least two different polyacrylate dispersions; wherein the thermoplastic binder comprises at least 50% by weight of at least one polyacrylate obtained from an anionic dispersion, wherein the thermoplastic composite material has a flow transition temperature in a range of 70° C. to 130° C.

15. The composite material of claim 14 wherein the thermoplastic binder comprises at least one polyacrylate obtained from an anionic dispersion having a minimum film forming temperature of up to 30° C.

16. The composite material of claim 15 wherein the thermoplastic binder comprises at least one polyacrylate obtained from an anionic dispersion having a minimum film forming temperature of up to 5° C.

17. The composite material of claim 15 wherein the thermoplastic binder comprises at least one polyacrylate obtained from an anionic dispersion having a minimum film forming temperature of from 15 to 25° C.

18. A composite material comprising:
   A) at least 15 percent by weight of one or more organic fibrous materials; and
   B) at least 15 percent by weight of a thermoplastic binder wherein said binder comprises a mixture formed from a mixture of at least tow different polyacrylate dispersions; and wherein the thermoplastic binder comprises at least one polyacrylate obtained from a cationic dispersion having a minimum film forming temperature of at least about 40° C., and wherein the thermoplastic composite material has a flow transition temperature in a range of 70° C. to 130° C.

19. The composite material of claim 18 wherein the thermoplastic binder comprises at least one polyacrylate obtained from a cationic dispersion having a minimum film forming temperature of at least about 70° C.

20. The composite material of claim 1 further comprising up to 15 percent by weight of inorganic salts, cationic polymers, preservatives, dyes, natural and/or synthetic fats, paraffins, natural and/or synthetic oils, silicone oils, ionic and/or nonionic surfactants.

21. A process for the production of a thermoplastic composite material comprising:
   a) forming an aqueous mixture by combining at least 15 percent by weight of one or more organic fibrous materials having fibers with a stretched fiber length of 0.1 to 15 mm, and at least 15 percent by weight of a thermoplastic binder, wherein said binder comprises a solids portion of a mixture of at least one anionic polymer dispersion and at least one cationic polymer dispersion;
   b) treating said aqueous mixture with an aqueous solution of an aluminum salt or a copper salt; to form a mixture comprising the thermoplastic composite material and an aqueous phase;
   c) separating at least a portion of the aqueous phase from the thermoplastic composite material; and
   d) drying said thermoplastic composite material.

22. The process of claim 21 comprising combining said anionic and cationic polymer dispersions either simultaneously or successively in any order with the organic fibrous materials.

23. The process of claim 21 comprising treating the thermoplastic composite material of a) with an aqueous solution of aluminum sulfate.

24. The process of claim 21 further comprising combining with the mixture comprising the thermoplastic composite material and the aqueous phase 0.1 to 10 percent by weight based on total solids in the thermoplastic composite material of at least one catatonically charged polymer having a molecular weight of 1,000 to 500,000.

25. A process for the surface coating or an object comprising:
   a) heating an object and the thermoplastic composite material of claim 1 to a temperature above the flow transition limit of the thermoplastic composite material;
   b) applying the thermoplastic composite material to the object; and
   c) cooling the object and thermoplastic composite material to a temperature below the flow transition limit of said thermoplastic composite material.

26. The process of claim 25 wherein the object comprises furnishing items, furniture, parts of furniture, wall panels, ceiling panels, or a combination thereof.

27. A process for surface coating of an object comprising:
   1) heating an object and a thermoplastic composite material having a flow transition temperature in a range of 70° C. to 130° C. comprising:
      A) at least 15 percent by weight of one or more organic fibrous materials; and
      B) at least 15 percent by weight of a thermoplastic binder, wherein said binder comprises a mixture formed from a mixture of at least two different polyacrylate dispersions, to a temperature above the flow transition temperature of the thermoplastic composite material;
   2) applying the thermoplastic composite material to the object; and
   3) cooling the object and the thermoplastic composite material to a temperature below the flow transition temperature of the thermoplastic composite material; wherein, an adhesive, to establish a permanent bond, is applied between the thermoplastic composite material and a surface of the object to be coated; the adhesive comprising:
      a) about 40 to 100 parts of an aqueous polyester polyurethane dispersion;
      b) about 20 to 40 parts of an aqueous polyacrylate dispersion; and
      c) about 15 to 30 parts of an EVA copolymer.

28. The process of claim 27 wherein said adhesive further comprises:
   d) up to about 0.5% by weight of wetting agent;
   e) up to about 0.5% by weight of defoamer;
   f) up to about 0.5% by weight of preservative; and
   g) up to about 0.5% to about 2% by weight of thickener.

* * * * *